United States Patent
Sala et al.

(10) Patent No.: US 7,162,108 B2
(45) Date of Patent: Jan. 9, 2007

(54) PLANAR LIGHTWAVE CIRCUIT VARIABLE OPTICAL ATTENUATOR

(75) Inventors: Anca L. Sala, Troy, MI (US); Duncan W. Harwood, Santa Clara, CA (US); Barthelemy Fondeur, Mountain View, CA (US); Anantharaman Vaidyanathan, Cupertino, CA (US); Robert J. Brainard, Sunnyvale, CA (US); Sanjay M. Thekdi, Santa Clara, CA (US); Thomas T. Nguyen, San Jose, CA (US); Ian Hutagalung, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 56 days.

(21) Appl. No.: 11/015,223

(22) Filed: Dec. 17, 2004

(65) Prior Publication Data

US 2005/0135728 A1    Jun. 23, 2005

Related U.S. Application Data

(60) Provisional application No. 60/530,199, filed on Dec. 17, 2003.

(51) Int. Cl.
 *G02F 1/01* (2006.01)
 *G02F 1/035* (2006.01)
 *G02F 1/00* (2006.01)
 *G02B 26/00* (2006.01)
 *G02B 6/26* (2006.01)
 *G02B 6/42* (2006.01)

(52) U.S. Cl. ............ 385/2; 385/1; 385/3; 385/39; 385/40; 359/237; 359/238; 359/240; 359/288

(58) Field of Classification Search .......... 385/1–3, 385/15, 39–42, 45, 129–132; 359/237, 238, 359/240, 245, 276, 288, 289
See application file for complete search history.

(56) References Cited

U.S. PATENT DOCUMENTS 4,781,424 A    11/1988    Kawachi et al. ............ 385/132

(Continued)

OTHER PUBLICATIONS

Inoue et al. "Polarization Sensitivity of a Silica Waveguide Thermooptic Phase Shifter for Planar Lightwave Circuits". IEEE Photonics Technology Letters, vol. 4, No. , pp. 36-38, Jan. 1992.*

(Continued)

*Primary Examiner*—Frank G. Font
*Assistant Examiner*—Derek L. Dupuis
(74) *Attorney, Agent, or Firm*—Allen, Dyer, Doppelt, Milbrath & Gilchrist, P.A.

(57) ABSTRACT

The invention relates to a variable optical attenuator constructed as a Mach Zehnder planar lightwave circuit, particularly including a channel waveguide support structure for heat isolation and stress relief to reduce polarization dependent loss (PDL) and power consumption in the device. Power reduction trenches comprise longitudinal segments having small stress relief pillars of cladding material left in between them in the etching process. The waveguides of the MZI are supported by a main pillar structure and integral stress relief pillars which remain after removal of the trenches. The waveguide is surrounded by air on three sides for improved heat isolation. The performance of the present invention shows substantial improvement in PDL and extinction ratio over the prior art continuous trench design, and also, to a smaller degree, over the case where power reduction trenches are not used at all. Segmented trenches appear to allow for the lowest stress on the two waveguide arms of all the cases including no trench and trenched devices.

18 Claims, 9 Drawing Sheets

U.S. PATENT DOCUMENTS

| | | |
|---|---|---|
| 6,031,957 A | 2/2000 | Suzuki et al. ............... 385/129 |
| 6,704,487 B1* | 3/2004 | Parhami et al. ............. 385/129 |
| 2002/0126933 A1* | 9/2002 | Goh et al. .................... 385/2 |

OTHER PUBLICATIONS

Polarization Sensitivity of a Silica Waveguide Thermooptic Phase Shifter for Planar Lightwave Circuits, by Inoue et al., IEEE Photonics Technology Letters, vol. 4, No. 1, pp. 36-38, Jan. 1992.

Improved 8×8 Integrated Optical Matrix Switch Using Silica-Based Planar Lightwave Circuits, by Okuno et al., Journal of Lighwave Technology, vol. 12, No. 9, pp. 1597-1606, Sep. 1994.

PLC type compact variable optical attenuator for photonic transport network, by Kawai et al., Electronic Letters, vol. 34, No. 3, pp. 264-265, Feb. 5, 1998.

Low-Power Compact 2×2 Thermooptic Silica-on-Silicon Waveguide Switch with Fast Response, by Lai et al, IEEE Photonics Technology Letters, vol. 10, No. 5, pp. 681-683, May 1998.

Feedback controlled variable optical attenuator for channel power regulation in WDM systems, by Jin et al., Electronic Letters, vol. 35, No. 11, pp. 916-917, May 27, 1999.

Low-Power Consumption Silica-Based 2×2 Thermooptic Switch Using Trenched Silicon Substrate, by Kasahara et al., IEEE Photonics Technology Letters, vol. 11, No. 9, pp. 1132-1134, Sep. 1999.

New Structure of Silica-Based Planar Lighwave Circuits for Low-Power Thermooptic Switch and its Application to 8×8 Optical Matrix Switch, by Kasahara et al., Journal of Lightwave Technology, vol. 20, No. 6, pp. 993-999, Jun. 2002.

* cited by examiner

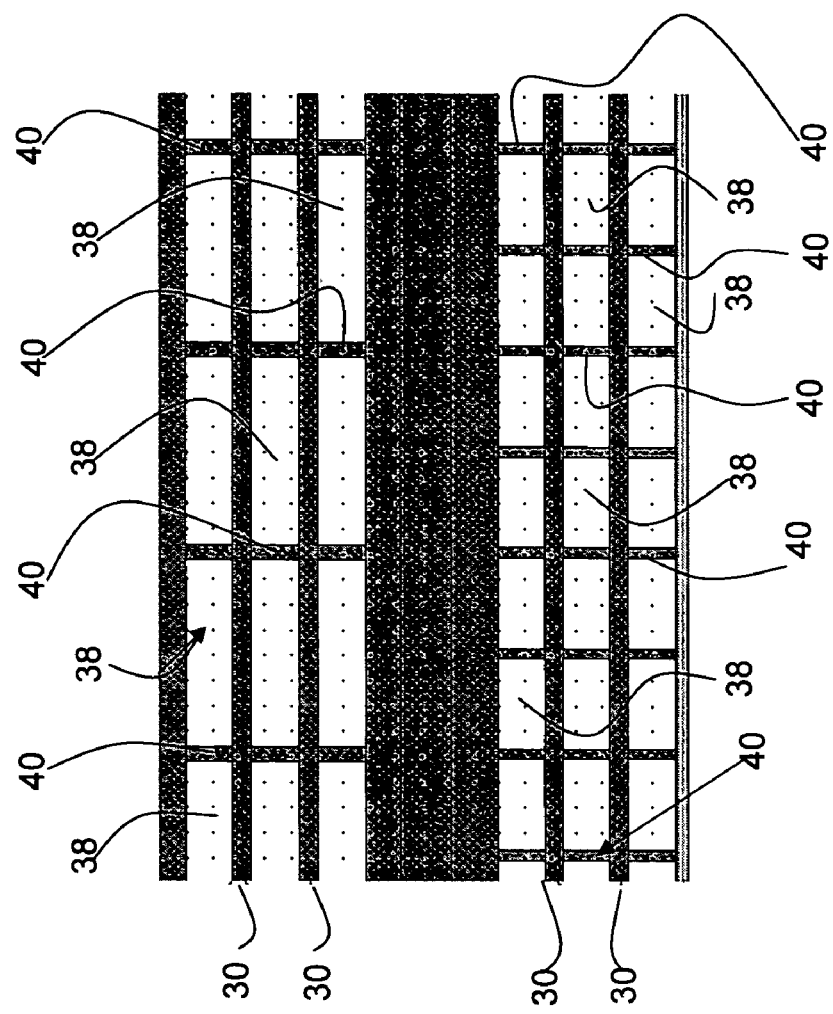
Fig. 11
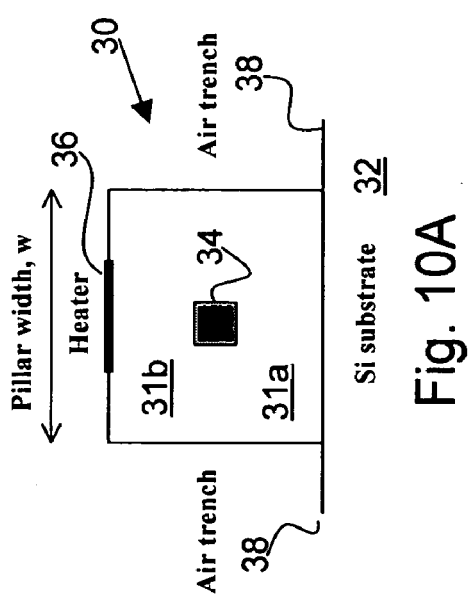
Fig. 10A
| Pillar width (um) | Switching power (mW) |
|---|---|
| 127 | 440 |
| 55 | 360 |
| 45 | 330 |
| 35 | 280 |
| 30 | 230 |
Fig. 10B

PLANAR LIGHTWAVE CIRCUIT VARIABLE OPTICAL ATTENUATOR

CROSS-REFERENCE TO RELATED APPLICATIONS

This application claims priority from provisional application No. 60/530,199 filed Dec. 17, 2003, which is incorporated herein by reference for all purposes.

MICROFICHE APPENDIX

Not Applicable.

TECHNICAL FIELD

The present application relates to a variable optical attenuator constructed as a Mach Zehnder planar lightwave circuit, particularly including a channel waveguide support structure for heat isolation and stress relief to reduce polarization dependent loss (PDL) and power consumption in the device.

BACKGROUND OF THE INVENTION

Recent evolution of optical communications networks emphasizes increased functionality of optical components, including wavelength filtering together with ADD/DROP capability and also power monitoring and adjustment for all the signal paths. Silica-on-silicon Planar Lightwave Circuits (PLC) is now a mature technology, producing highly stable and reliable optical components capable of accomplishing the above functions with excellent performance. The capability of integrating multiple functions in the same chip is highly desirable to reduce module size, simplify fiber management and reduce manufacturing cost.

PLC Mach-Zehnder Interferometer (MZI) devices have been proposed and investigated for applications as optical switches and variable optical attenuators. The principle of operation is based on the thermo-optic effect of silica; by producing heat with a thin film heater positioned above the waveguide the effective index in one of the MZ arms is increased in order to create a phase difference between the arms.

One of the main problems associated with silica-on-silicon MZI devices is the polarization dependence, which can limit the extinction ratio of the optical switches and result in large PDL in the region of high signal attenuation in the case of variable optical attenuator (VOA) devices. At the same time, the power consumption of the MZI devices on Si substrate tends to be large due to the much higher thermal conductivity of Si compared to the thermal conductivity of glass. Complete switching of light between zero and maximum attenuation requires about 0.5 W of power. The power consumption can be substantially reduced by etching trenches on each side of the MZ arms to confine the heat to a small region surrounding the waveguide.

The problem of polarization dependence in silica on silicon devices is addressed in prior U.S. Pat. No. 4,781,424 by Masao Kawachi et al. of Nippon Telegraph and Telephone Corporation. In this patent it is stated that, "tensile stresses are imparted to the inside of the film surface of the cladding layer because of the difference in thermal expansion coefficient between the cladding layer and the silica glass substrate. That is, it exhibits stress-induced birefringence".

In one embodiment Kawachi et al. propose a stress relief groove or grooves formed in the cladding layer adjacent to the core portion in order to control birefringence of the optical waveguide. Grooves are formed by a reactive ion etching process. If desired after forming grooves through the cladding layer, grooves can be further recessed into the silicon substrate using a wet etching liquid (for instance, a mixture of hydrofluoric acid, nitric acid and acetic acid). It is taught that birefringence can be controlled by the position of the stress relieving grooves, and that in the regions where grooves are provided birefringence can be reduced to substantially zero. It is suggested that it is effective to position a short groove at a selected location to locally vary the birefringence characteristics in the optical waveguide, as an alternative to a uniform groove along the core portion of an optical waveguide.

Kawachi et al. disclose a further preferred embodiment comprising a Mach Zehnder interferometer in which stress relieving grooves are provided on one of the waveguide arms over a segment length $\Delta L$ corresponding to the difference in length between the two waveguide arms. In this stress groove region, periodic recess regions are etched underneath the waveguide. The device is described as polarization insensitive.

Undercut etched grooves in planar lightwave circuit devices are also disclosed in U.S. Pat. No. 6,031,957 by Ryoji Suzuki et al. of Hitachi Cable Ltd issued Feb. 29, 2000. In this case, the waveguide structure is continuously separated from the substrate in the longitudinal direction of the waveguide core by etching away a thin silicon film between the cladding material and the substrate. A series of intermittent lateral grooves permit introduction of the etching substance while leaving intermittent cladding material supporting the suspended waveguide structure above the substrate. This structure is said to provide good heat insulating structure for preventing heat dissipation to a surrounding portion in a lateral direction from the core.

In combination, the prior art seems to teach that a planar lightwave circuit having lateral grooves and a continuous undercut separating the waveguide from the substrate would provide both heat isolation and polarization insensitivity.

In investigating the prior art, this teaching was found to be insufficient. As will be discussed in detail later, it was found that a device with continuous lateral grooves or trenches does improve the heat isolation and thus reduce the switching power, but the polarization dependent loss is higher than without grooves or trenches. Furthermore, the additional process requirements for producing an undercut waveguide are costly and reduce the strength and integrity of the device.

It is desired to create a planar lightwave circuit attenuator or switch which can provide greater dynamic range or higher extinction ratio and improved polarization dependent loss, while reducing its power consumption.

SUMMARY OF THE INVENTION

Accordingly, an object of the present invention is to provide a variable optical attenuator comprising a planar lightwave circuit comprising a waveguide embedded in a cladding layer supported on a substrate, the lightwave circuit comprising a Mach Zehnder interferometer comprising:

a first optical coupler having a device input and a first and a second output and a second optical coupler having a first and a second input and a device output;

a first channel waveguide optically coupling the first output of the first optical coupler to the first input of the second optical coupler;

a second channel waveguide optically coupling the second output of the first optical coupler to the second input of the second optical coupler;

a heater disposed on each of the channel waveguides for selectively modifying the index of refraction of at least one of the waveguides, thereby controlling a transmission power for selectively attenuating an optical signal;

wherein a portion of the cladding layer on both sides of the channel waveguides has been selectively removed for a predetermined length to form a channel waveguide support structure comprising:

a main pillar of width w to support each channel waveguide on the substrate and exposed to air on three sides over the predetermined length, thereby reducing the heat loss by conduction and the power consumption of the variable optical attenuator, and a plurality of stress relief pillars of width t less than w, integral with the main pillar, and spaced regularly at common points on opposite sides of the main pillar over the predetermined length in order to provide support to the main pillar, thereby reducing the polarization dependent loss of the variable optical attenuator.

Thus an aspect of the present invention provides a variable optical attenuator comprising a Mach Zehnder planar lightwave circuit formed in a cladding layer supported on a substrate, the Mach Zehnder comprising:

a first optical coupler having a device input and a first and a second output and a second optical coupler having a first and a second input and a device output;

a first channel waveguide optically coupling the first output of the first optical coupler to the first input of the second optical coupler;

a second channel waveguide optically coupling the second output of the first optical coupler to the second input of the second optical coupler;

a heater disposed on each of the channel waveguides for selectively modifying the index of refraction of at least one of the waveguides, thereby controlling a transmission power for selectively attenuating an optical signal;

wherein the cladding layer includes a plurality Ns of power reduction trenches formed on either side of the channel waveguides substantially parallel thereto, each trench being significantly shorter in length than the channel waveguide;

a main pillar structure supporting the channel waveguides, defined by the parallel trenches, having a width w;

the cladding layer further including a plurality of stress relief pillars cohesive with the main pillar and a surrounding cladding layer, the stress relief pillars having a width t are disposed on opposite sides of the channel waveguides at common points;

and wherein w is greater than t, and Ns and t are variables to determine the polarization dependent loss of the device.

In embodiments of the invention, a planar lightwave circuit comprises:

a lightwave circuit supported in a grid of cladding material disposed on a substrate wherein a main pillar of cladding material comprises a central elongate structure in the grid, and contains a channel waveguide, the pillar having a width w and a height substantially equal to a thickness of the cladding material on the substrate;

a plurality of stress relief pillars comprise orthogonal structures in the grid, the stress relief pillars are integral with the main pillar, having a width t less than w, and are spaced regularly along the length of the main pillar on opposite sides thereof; and in regions between the grid structures the substrate is exposed to air.

BRIEF DESCRIPTION OF THE DRAWINGS

Further features and advantages of the present invention will become apparent from the following detailed description, taken in combination with the appended drawings, in which:

FIG. 10A is a schematic illustration of a cross-section of a MZI waveguide arm in accordance with the present invention;

FIG. 10B is a chart of switching power and main pillar width;

FIG. 11 is a schematic illustration of a top view of the segmented trenches in two alternative configurations in accordance with the present invention;

It will be noted that throughout the appended drawings, like features are identified by like reference numerals.

DETAILED DESCRIPTION OF THE PREFERRED EMBODIMENT

Figure 1:
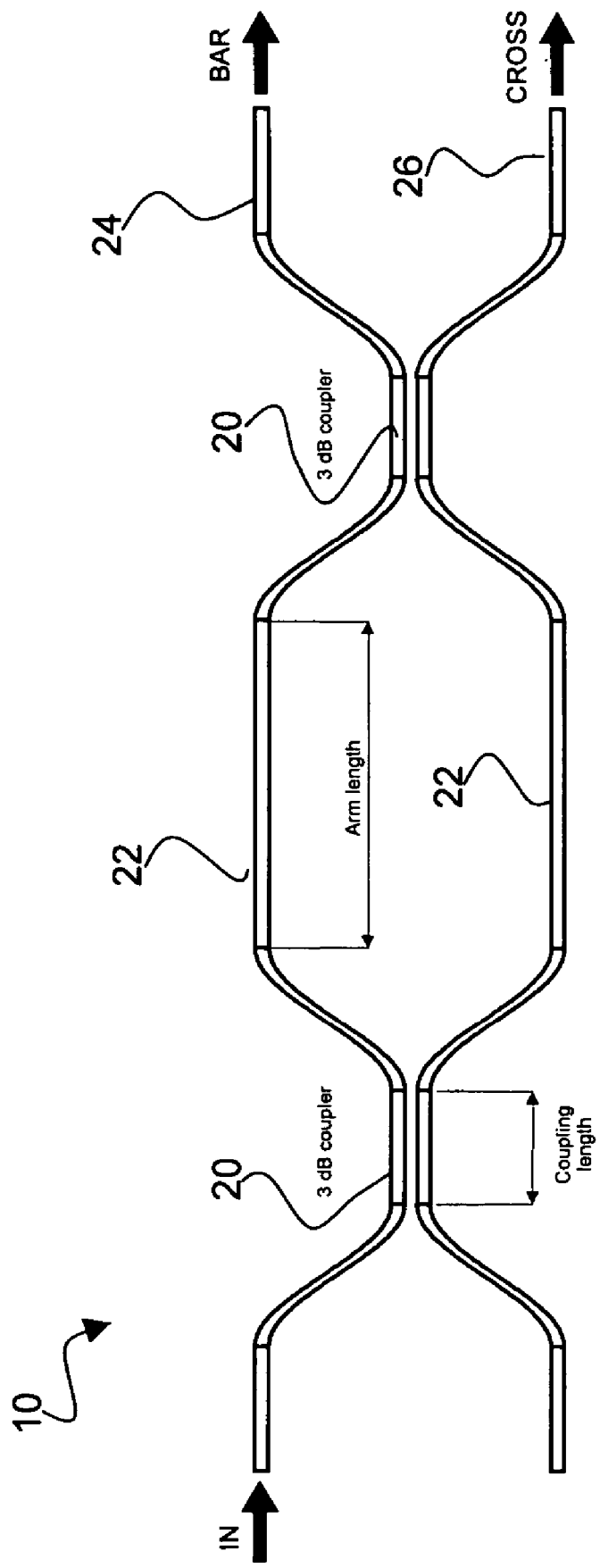
FIG. 1 is a schematic illustration of a Mach Zehnder interferometer.

As shown in FIG. 1, a PLC MZI device 10 consists of two 3 dB directional couplers (DC) 20 or Y splitters that equally split/recombine light between two MZ arms 22. Thin film heaters 36 (see FIG. 10) are deposited on top of the upper cladding layer 31b (FIG. 10) directly above and running along the two MZ arms 22 to control the phase difference between them.

Figure 2:
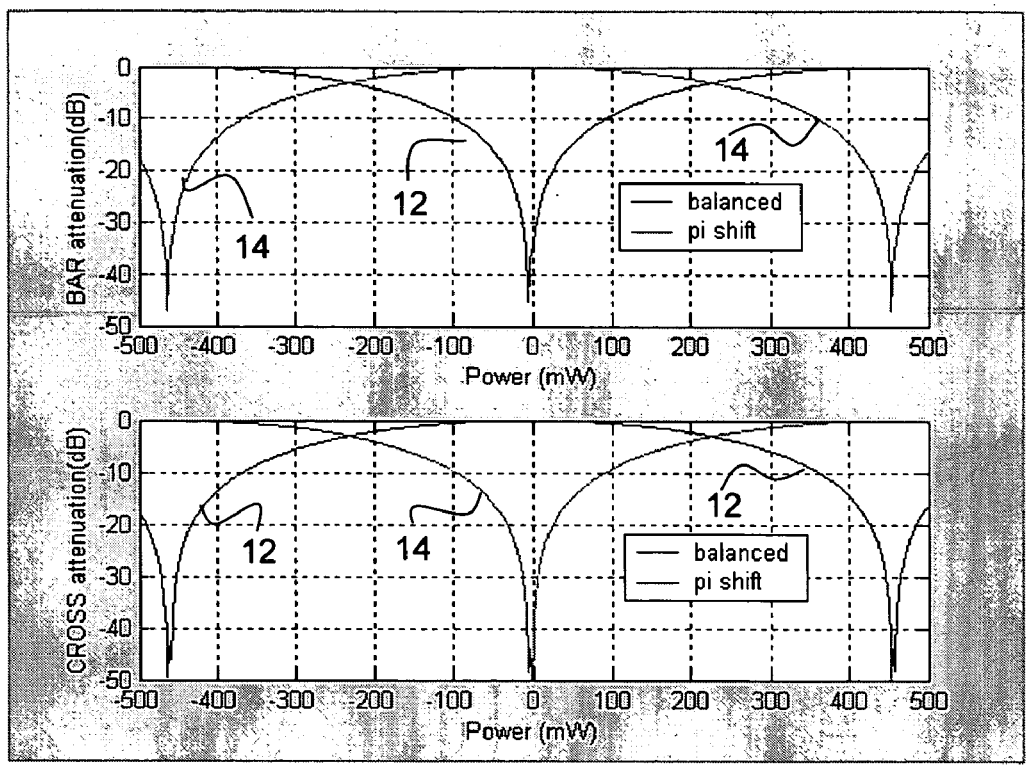
FIG. 2 is a graphic illustration of attenuation vs. power in Bar and Cross configurations of a balanced MZI and a Π shifted MZI.

For a DC based MZI device, the two outputs from the device are denoted as BAR 24 and CROSS 26. A balanced MZI device has arms of equal length, resulting in the transmission through the device as a function of the electrical power applied to each one of the thin film heaters 36 shown in FIG. 2 as curve 12 (power applied to top heater negative, bottom heater positive). A Π shifted MZI has one of the 2 arms, for example the top one, longer than the bottom arm by an optical path length equal to λ/2 (lambda/2), reversing the behavior of the 2 outputs from the balanced case, as shown in FIG. 2 as curve 14. As seen in FIG. 2 the response of the MZI is highly nonlinear. The slope of the response increases sharply in the region of high attenuation, over 20 dB, leading to high sensitivity of the device to small variations, for example a birefringence difference between the arms.

For MZI devices where splitting and recombining of light is achieved with Y-splitters, the response of the single output is similar to the CROSS output response of the DC MZI.

Figure 3:
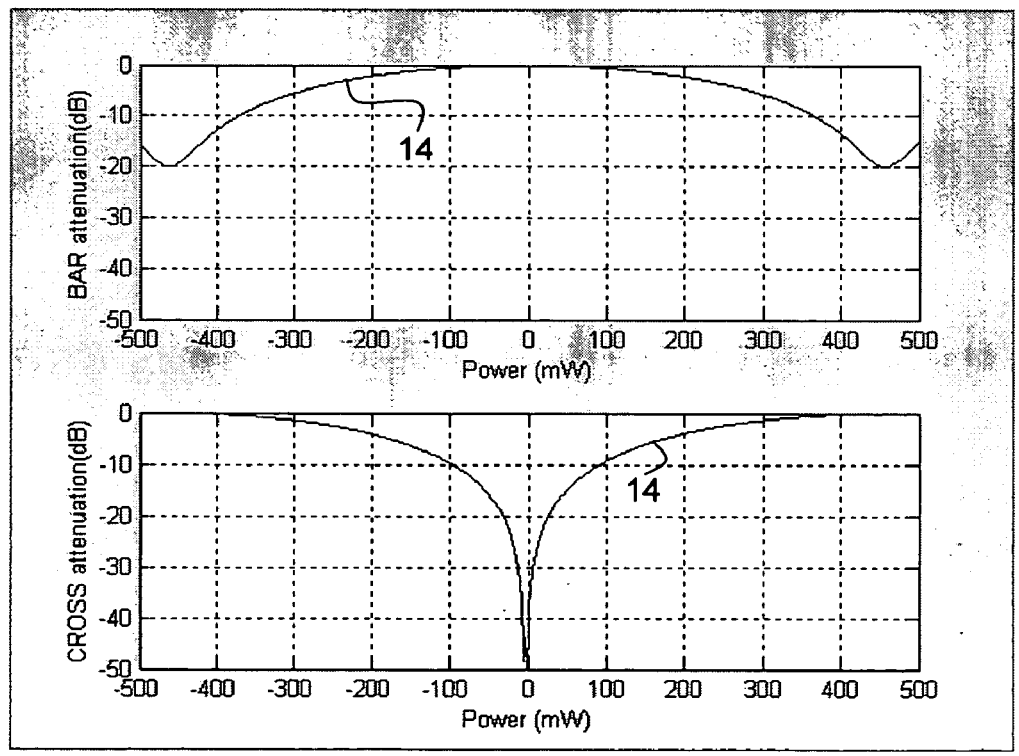
FIG. 3 is a graphic illustration of attenuation vs. power in Bar and Cross configurations of a Π shifted MZI demonstrating a non-ideal coupling ratio.

In practice, due to process variations a number of parameters will have different values from the theoretical ones. One of these is the coupling ratio (fraction of total optical power coupled to the cross port of the coupler) of the 3 dB couplers, which can vary by as much as ±0.1 from the ideal value of 0.5. This variation will produce different behaviors in the 2 outputs of the MZI device. The dynamic range of the BAR output is reduced with imperfect 3 dB couplers. The dynamic range of the CROSS output is practically insensitive to coupling ratio values, as long as the two couplers have the same coupling ratio. The behavior is shown in FIGS. 3 and 4 for a Π (pi) shifted MZI, where the couplers are assumed to have equal coupling ratios.

Figure 4:
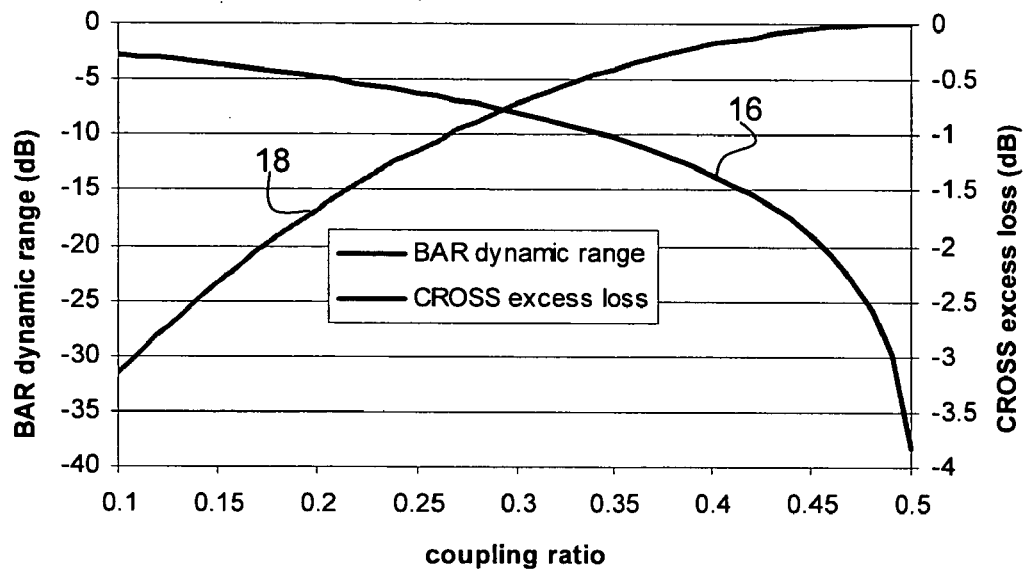
FIG. 4 is a graphic illustration of Bar output dynamic range and Cross excess loss as a function of coupling ratio for a Π shifted MZI.

An excess loss increase at the CROSS output is predicted for coupling ratio different from 0.5; this excess loss is negligible, <0.1 dB, if the coupling ratio is better than 0.43, shown as curve 18 in FIG. 4.

In practice, the two DC's are affected in a similar manner by process variations so the two coupling ratios are virtually equal, and the coupling ratio does not differ by more than ±0.05 from the ideal value of 0.5. Thus the CROSS output is more advantageous to use than the BAR output of the MZI VOA, providing for better dynamic range when process variation of parameters is taken into account.

The polarization sensitivity of the MZI response shows a dependence on the power applied to the thin film heater through the so-called Heat Induced Birefringence (HIB). It is known that when heating one of the two MZ arms the birefringence of that arm will increase due to more stress in the plane of the waveguide than perpendicular to the waveguide. If the region of high heat is the same as the region of large attenuation, the PDL of the device and the dynamic range will be negatively affected by the HIB. To alleviate this, a preferred configuration for an MZI switch or VOA is using the CROSS output of a Π shifted MZI, for which large attenuation corresponds to the low heat region. The following will focus on this preferred case, but are not limited to it.

Due to the nonlinearity of the MZI response, the device is very sensitive to phase differences between the two arms in the region of high attenuation. In order to control the attenuation down to 25–30 dB with enough resolution the phase difference between the arms needs to be controlled with accuracy of 0.1–0.2°, equivalent to less than 0.5 mW of electrical power. This requirement applies to any factors contributing to asymmetry between the 2 arms, including polarization dependence.

For accurate control of the response of the MZI care must be taken to have very good symmetry between the arms 22 in the absence of heat from the thin film heaters 36. For this, thin film heaters 36 need to be deposited on both arms 22 even though only one heater is needed to operate the switch/VOA. This is due to the fact that the metal film will add stress to the waveguide 30 below it even unpowered. Other factors to be taken into account are photomask resolution which should be high, and ensuring uniform etching of the two arms 22.

Figure 5:
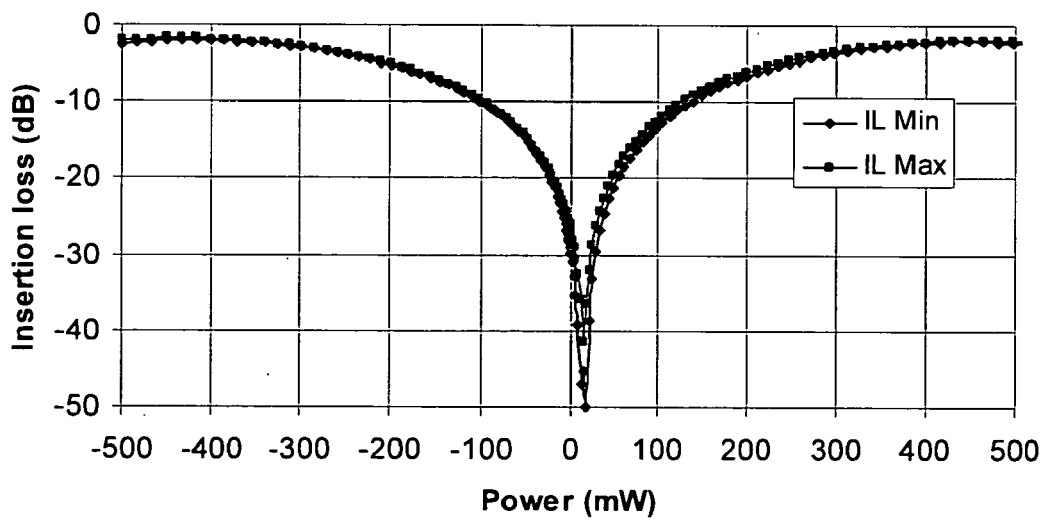
FIG. 5 is a graphic illustration of two extreme polarizations in a Π shifted MZI, from experimental data.
Figure 5A:
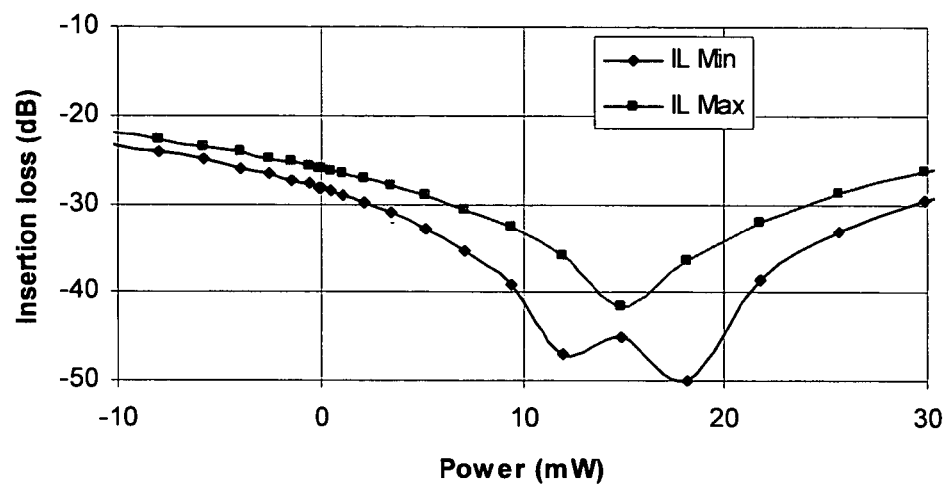
FIG. 5A is a detailed graph of the zero power region of the graph shown in FIG. 5.

The response of the CROSS output of a Π shifted PLC MZI, obtained experimentally, is shown in FIG. 5, where the two curves correspond to two extreme polarizations. FIG. 5A is a close-up of the region of powers around zero.

As seen in FIG. 5, the power corresponding to maximum attenuation is not exactly zero, due to effective index variations between the 2 arms. Furthermore, the insertion loss for TE and TM polarizations reaches maximum at slightly different powers. The difference between these powers, called Polarization Dependent Power (PDP) or equivalently Polarization Dependent Phase if expressed in degrees, leads to increased PDL in the high attenuation region. The device does not have power reduction trenches, so that the switching power (power needed to completely switch the device from minimum to maximum attenuation) is about 450 mW.

Figure 6:
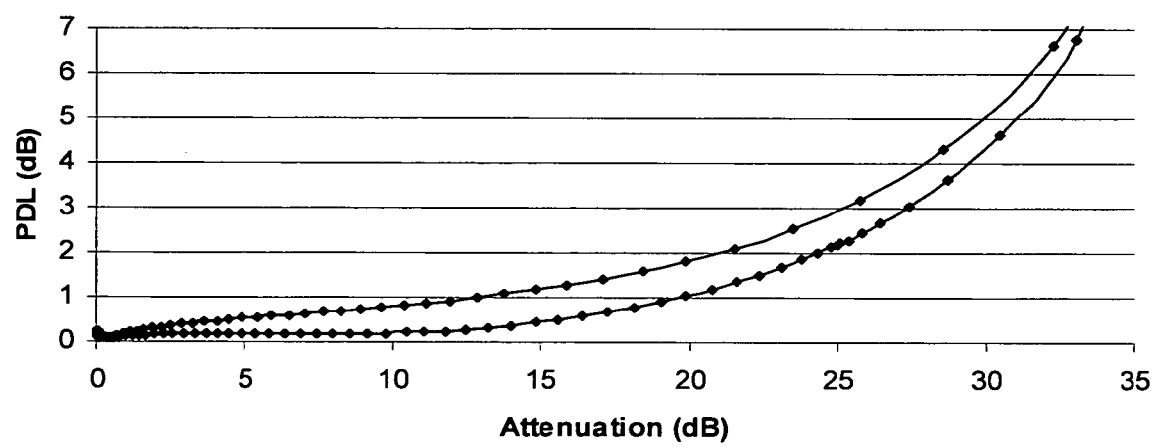
FIG. 6 is a graphic illustration of PDL vs. attenuation for the device tested in FIG. 5.

The PDL at various attenuations for the device in FIG. 5 is shown in FIG. 6, where the two curves each correspond to one of the two heaters. The PDL is monotonically increasing with attenuation, with one of the heaters allowing for better PDL values. For this device, PDL is less than 0.5 dB up to 15 dB attenuation; at 25 dB attenuation, the minimum PDL is 2.2 dB. The dynamic range is 41 dB.

Figure 7A:
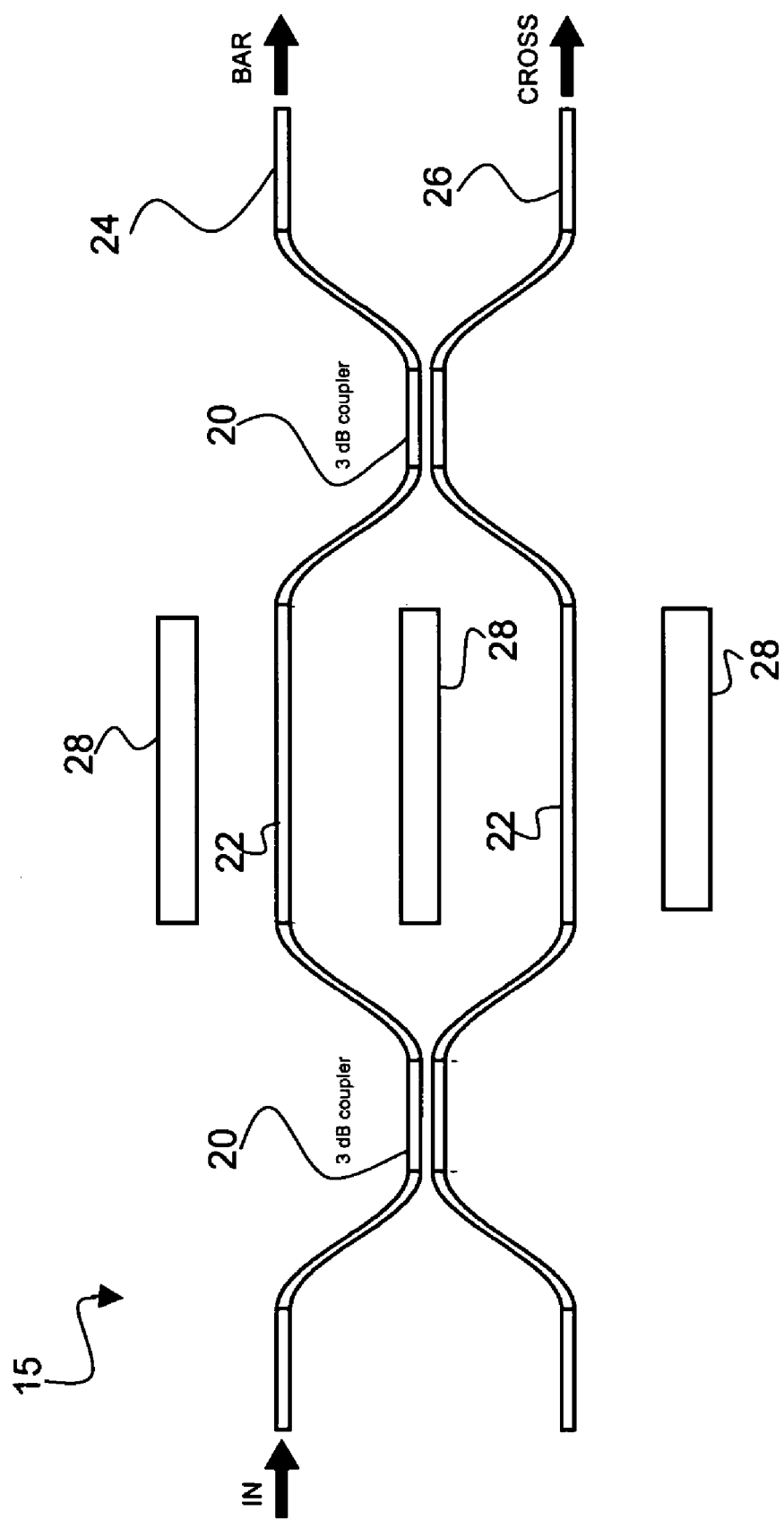
FIG. 7A is a schematic illustration of a Prior Art MZI with continuous power reduction trenches along the waveguide arms.
Figure 7B:
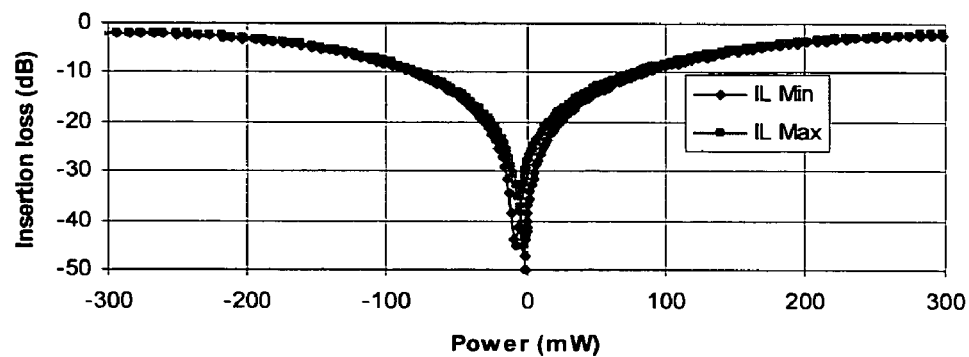
FIG. 7B is a graphic illustration of transmission vs. power for the device in FIG. 7A.
Figure 8:
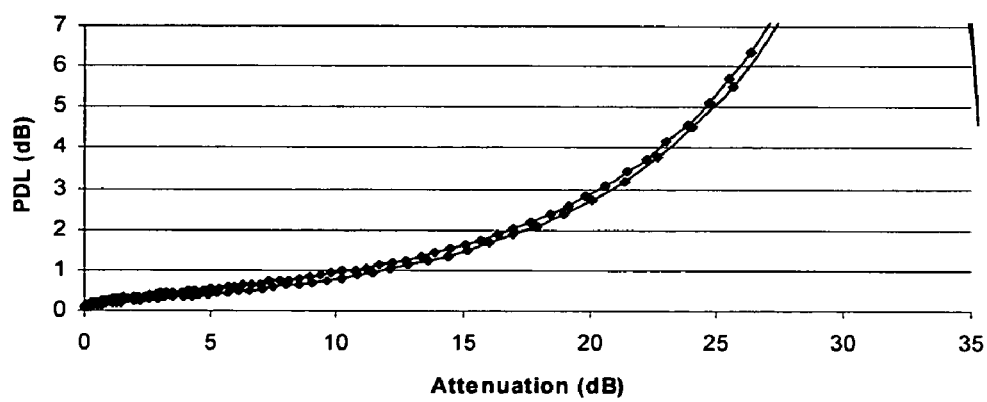
FIG. 8 is a graphic illustration of PDL vs. attenuation for the device in FIG. 7A.

When trenches for power reduction 28 are etched around the waveguides 22 as shown in FIG. 7A a typical response of the MZI device 15 is shown in FIGS. 7B and 8. The switching power has been reduced to 280 mW, but the PDL has higher values at high attenuation than without trenches, and the dynamic range has been reduced. Specifically, PDL is less than 1.2 dB up to 15 dB attenuation and less than 5.1 dB up to 25 dB attenuation. Dynamic range is 35 dB.

Figure 9:
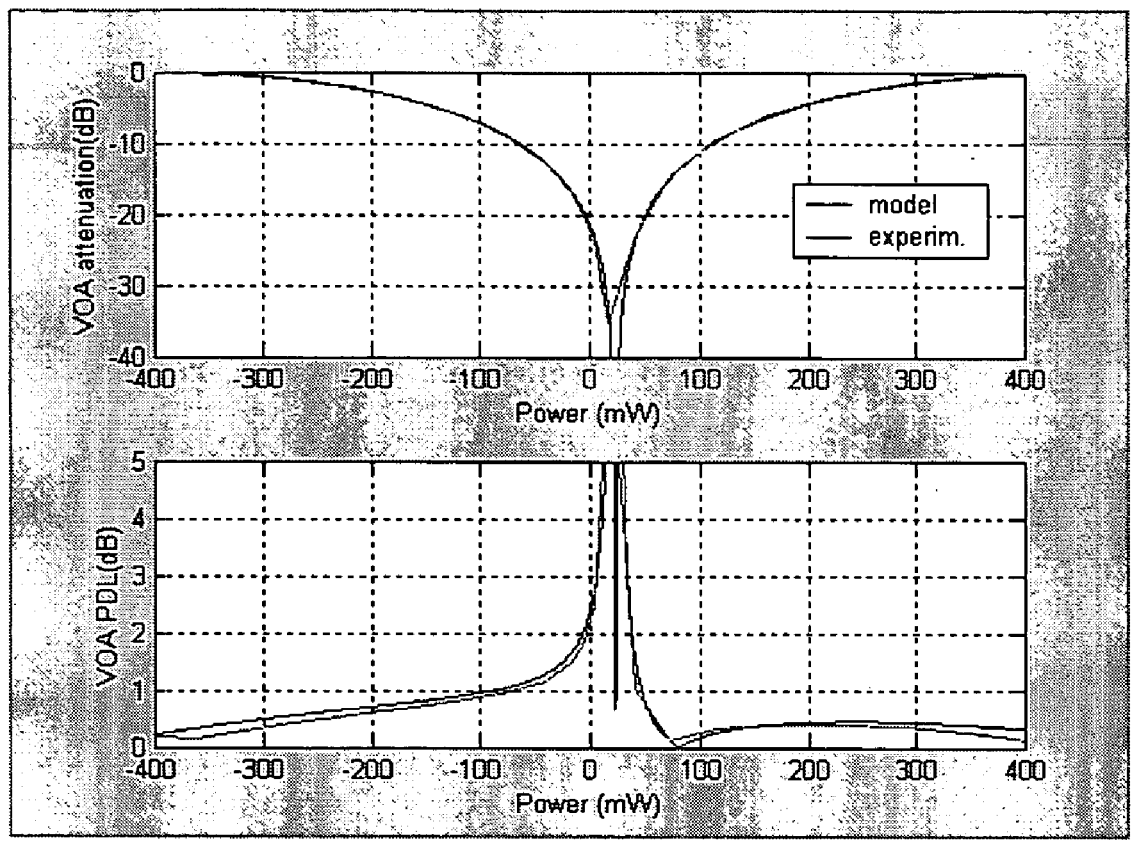
FIG. 9 is a graphic illustration of attenuation and PDL of Cross output of a MZ VOA vs. power, comparing modeled and experimental results.

Modeling of the transmission of the switch/VOA as a function of phase difference between the arms, or equivalently electrical power applied to one of the heaters, allows insight into the dependence of the PDL on device characteristic parameters—coupling ratio, HIB, PDP. FIG. 9 compares modeling and experimental results for average polarization transmission and PDL of the CROSS output of a Π shifted MZI device. Very good agreement is obtained with a model that takes into account individual coupling ratio values for each coupler in each extreme polarization, PDP and HIB. PDP is modeled as a static power difference between the 2 polarizations, that is independent of the power applied, while HIB is modeled as differential birefringence between the arms linearly increasing with the power applied.

The model, well validated by experimental results, shows that PDP is the determining factor of PDL with the preferred configuration of the VOA or switch, and a linear relationship exists between PDL and PDP. The model can thus give the maximum PDP value corresponding to a desired maximum PDL for the required dynamic range or extinction ratio of the VOA/switch. For example, a VOA device required to have a maximum PDL of 1.5 dB for a dynamic range of 25 dB can be obtained if the PDP has values less than 1.3°, while for the devices mentioned above the PDP has values of 1.8° and 3.7° respectively.

A multitude of factors affect the PDP of PLC MZI devices. As mentioned above any asymmetry between the two arms of the MZI which is polarization dependent can affect the PDP. One important factor is the upper cladding stress, which needs to be optimized in order to minimize the PDP. Trenches etched on the sides of the waveguide arms also have an effect on the PDP as seen when comparing the response of the devices in FIGS. 5–8.

The increased PDP/PDL with the trenched device is probably due to the mechanism of stress relaxation of the two relatively long arms (typically 4–5 mm long). When the surrounding material is removed, the long arms are free to deform under the influence of strain applied at the two ends.

In accordance with the present invention power reduction trenches are disclosed that make possible the design of VOA devices with exceptionally low PDL over a wide range of attenuation and optical switches with very high extinction ratio.

Power reduction trenches are formed generally by etching, such as reactive ion etching, or wet etching using hydrofluoric acid to remove a portion of cladding material from the PLC adjacent the waveguides 22. They are normally rectangular shaped running in series along substantially the entire length of the MZI arms 22 as shown in two alternative configurations in FIG. 11. In the invention, the regular long uniform trench 28 of FIG. 7A is replaced with one made out of longitudinal segments 38, having small stress relief pillars 40 of cladding material left in between them, as shown in FIG. 11. The waveguides 22 are supported by a main pillar structure 30 which remains after removal of the trenches 38. The waveguide 22 in the main pillar 30 is surrounded by air on three sides for improved heat isolation, and consequently reduced power consumption.

The stress relief pillars 40 remain after the etching process integral with the main pillar 30. They provide support at regular intervals or symmetrically arranged along the main pillar 30. They are preferably disposed perpendicularly to the main pillar 30 at common points on opposite sides of the main pillar 30. In preferred designs they define a perpendicular grid between the parallel waveguides 22. Symmetry of design between the two waveguides 22 including the depth and dimensions of the segmented trenches 38, the width of the main pillars 30 and precise formation of the stress relief pillars 40 are important to balance the stress imposed on each of the waveguides. The number of segments 38, Ns, and the width of the stress relief pillars 40, t, are parameters to be varied in the trench design.

In contrast to the continuous trenches 28 FIG. 7A, the segmented trenches 38 allow controlled stress release along the waveguide arms 22 and introduce no asymmetric deformations. On the other hand the presence of the stress relief pillars 40 can produce a penalty in the power consumption if the heat is not well confined in the regions of the stress relief pillars 40. In order to keep the power penalty at a minimum the stress relief pillars 40 must have narrow width t, compared to the width w of the main pillar 30, which is preferably about 20–30 μm. The number of segments Ns must be sufficient to provide enough support for the waveguide arms to prevent possible deformation or asymmetry. In a preferred experimental device a series of trench segments 4 mm long is composed of Ns=12 trench segments 38 divided by 10 stress relief pillars 40 of a width t=20 μm.

The cross section of one waveguide arm 30 with power reduction trenches 38 is shown in FIG. 10. The trenches 38 are also preferably rectangular in profile. The width and depth of the trenches will both affect the power consumption. Best confinement of heat is achieved when the trench 38 reaches into the Si substrate 32. The power consumption is then proportional to the width of the pillar of glass, w, remaining after trenching as shown in FIG. 10.

Figure 12:
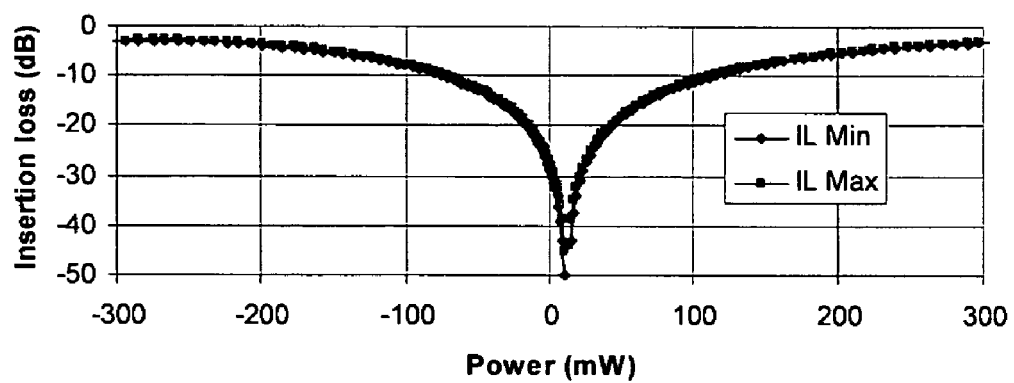
FIG. 12 is a graphic illustration of transmission vs. power for a device with segmented trenches in accordance with the present invention.
Figure 13:
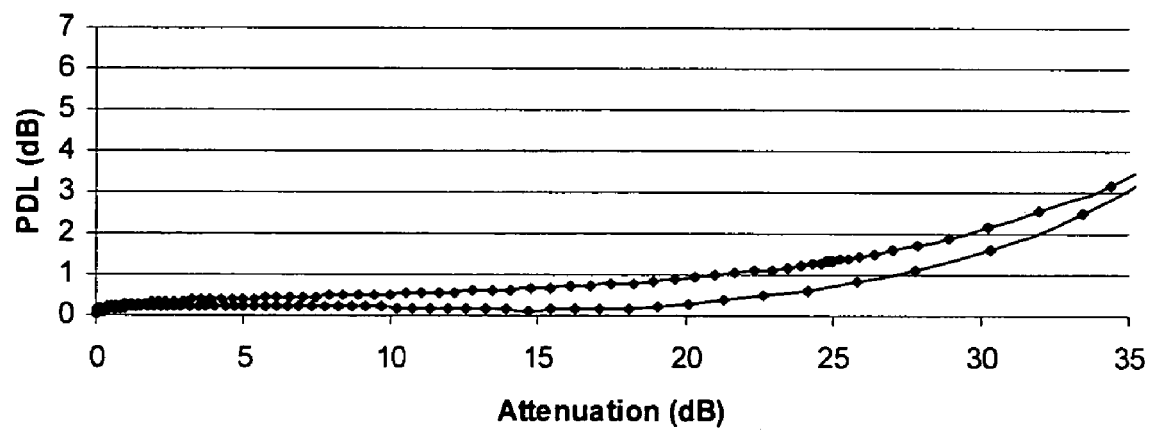
FIG. 13 is a graphic illustration of PDL vs. attenuation for the device of FIG. 12.

FIGS. 12 and 13 show experimental results obtained with the segmented trench of the present invention, to be compared with results in FIGS. 7B and 8 with continuous trench. Excellent improvement of PDL to very large attenuation values is obtained with segmented trenches, benefiting also the extinction ratio. The values of PDL are less than 0.2 dB up to 15 dB attenuation and less than 0.8 dB up to 25 dB attenuation. This PDL is achieved with very low PDP~1°. The dynamic range is 45 dB. Switching power is 290 mW, 10 mW higher than with continuous trench, a penalty of less than 5% of the switching power.

Interestingly, the performance of the present invention shows improvement also over the case discussed with respect to FIG. 5, where power reduction trenches are not used at all, although less substantial than the improvement over continuous trenches shown in FIG. 7A. Segmented trenches appear to allow for the lowest stress on the two waveguide arms of all the cases including no trench and trenched devices.

Using different values for the parameters Ns and t, the design can be tuned to optimize the PDL with a variety of processing conditions. For example, the designs have been validated with two different materials for the thin film heater.

Although the description of the invention was done for a directional coupler based MZI, the invention applies also for Y-based MZI or combination of DC and Y coupler MZI.

The embodiments of the invention described above are intended to be exemplary only. The scope of the invention is therefore intended to be limited solely by the scope of the appended claims.

What is claimed is:

1. A variable optical attenuator formed of a planar lightwave circuit that includes a waveguide structure embedded in a cladding layer supported on a substrate, the lightwave circuit containing a cross-configured π (pi)-shifted Mach Zehnder interferometer comprising:

a first optical coupler having a device input and a first output and a second output;

a second optical coupler having a first input and a second input and a device output;

a first channel waveguide optically coupling the first output of the first optical coupler to the first input of the second optical coupler;

a second channel waveguide optically coupling the second output of the first optical coupler to the second input of the second optical coupler; and respective heaters disposed on the first and second channel waveguides for selectively modifying the index of refraction of at least one of the first and second channel waveguides, thereby controlling a transmission power for selectively attenuating an optical signal; and wherein:

a portion of the cladding layer on both sides of the first and second channel waveguides has been selectively removed for a predetermined length to form a channel waveguide support structure, said channel waveguide support structure comprising:

a main pillar of width w to support each of said first and second channel waveguides on the substrate and exposed to air on three sides over the predetermined length, thereby reducing heat loss by conduction and power consumption of the variable optical attenuator, and a plurality of stress relief pillars of width t less than w, integral with the main pillar, and spaced regularly at common points on opposite sides of the main pillar over the predetermined length in order to provide support to the main pillar, thereby reducing polarization dependent phase (PDP) of said interferometer that is independent of the power applied to the heaters, and thereby reducing the polarization dependent loss of the variable optical attenuator.

2. The variable optical attenuator of claim 1, wherein some of the stress relief pillars of the first and second channel waveguides are in contact with the main pillars of both of said first and second channel waveguides and the others are aligned in a grid pattern orthogonal to the main pillars.

3. The variable optical attenuator of claim 1, wherein the portion of cladding material removed comprises a series of substantially rectangular shaped trenches substantially parallel to the first and second channel waveguides.

4. The variable optical attenuator of claim 3, wherein the trenches have a depth substantially equal to a depth of the cladding layer.

5. The variable optical attenuator of claim 3, wherein the trenches have a depth greater than a depth of the cladding layer, the trenches penetrating into the substrate.

6. The variable optical attenuator of claim 1, wherein the predetermined length comprises substantially the entire length of the first and second channel waveguides.

7. The variable optical attenuator of claim 1, wherein the width w of the main pillar is selected in dependence upon an allowable power consumption.

8. The variable optical attenuator of claim 1, wherein the number and width t of the stress relief pillars are varied to optimize polarization dependent loss and power consumption of the variable optical attenuator.

9. The variable optical attenuator of claim 1, wherein the first and second optical couplers are directional couplers.

10. The variable optical attenuator of claim 1, wherein the first and second optical couplers are Y splitters.

11. The variable optical attenuator of claim 1, wherein the first and second optical couplers are directional couplers, and the attenuator performs the function of an optical switch that is operable between two conditions: zero attenuation and full attenuation, thus directing 100% of an input optical signal through a cross output, or 100% of an input optical signal through a bar output.

12. The variable optical attenuator of claim 1, wherein the variable optical attenuator performs the function of an optical switch that is operable between two conditions, an on state with zero attenuation, and an off state of full attenuation, and having a dynamic range of 45 dB.

13. A variable optical attenuator formed as a cross-configured $\pi$ (pi)-shifted Mach Zehnder interferometer-based planar lightwave circuit in a cladding layer supported on a substrate, said cross-configured $\pi$ (pi)-shifted Mach Zehnder interferometer comprising:
    a first optical coupler having a device input and a first output and a second output;
    a second optical coupler having a first input and a second input and a device output;
    a first channel waveguide optically coupling the first output of the first optical coupler to the first input of the second optical coupler;
    a second channel waveguide optically coupling the second output of the first optical coupler to the second input of the second optical coupler; and
    respective heaters disposed on said first and second channel waveguides for selectively modifying the index of refraction of at least one of the first and second waveguides, thereby controlling a transmission power for selectively attenuating an optical signal, and wherein:
    the cladding layer includes
        a plurality Ns of power reduction trenches formed on either side of the first and second channel waveguides substantially parallel thereto, each trench being significantly shorter in length than the first and second channel waveguides;
        a main pillar structure supporting the first and second channel waveguides, defined by the parallel trenches, having a width w;
        a plurality of stress relief pillars cohesive with the main pillar and a surrounding cladding layer, the stress relief pillars having a width t and being disposed on opposite sides of the first and second channel waveguides at common points; and wherein
        w is greater than t, and Ns and t are variables to determine the polarization dependent loss of the variable optical attenuator.

14. The variable optical attenuator of claim 13, wherein the trenches have a depth substantially equal to a depth of the cladding layer.

15. The variable optical attenuator of claim 13, wherein the trenches have a depth greater than a depth of the cladding layer, the trenches penetrating into the substrate.

16. The variable optical attenuator of claim 13, wherein the first and second optical couplers are directional couplers.

17. The variable optical attenuator of claim 13, wherein the first and second optical couplers are Y splitters.

18. The variable optical attenuator of claim 13, wherein the Mach Zehnder interferometer has a polarization dependent phase (PDP) of less than 1.3 degrees.

* * * * *